W. R. CLAYTON.
METHOD OF PRESERVATION.
APPLICATION FILED DEC. 2, 1915.
1,252,090.
Patented Jan. 1, 1918.
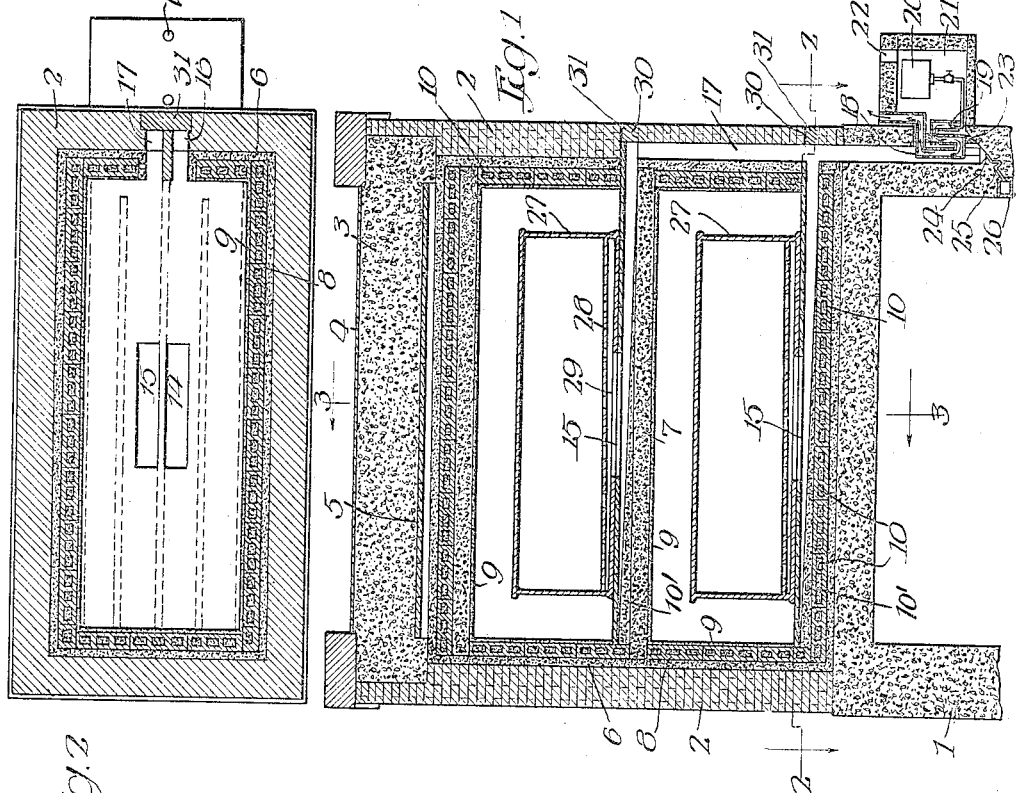
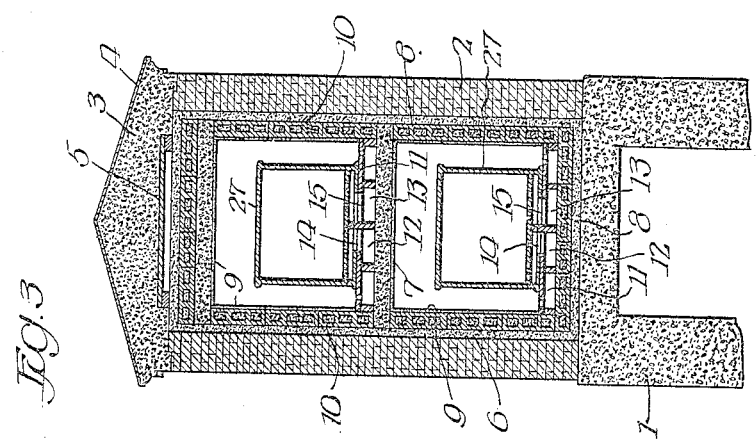

UNITED STATES PATENT OFFICE.

WILLIAM R. CLAYTON, OF EVANSTON, ILLINOIS.

METHOD OF PRESERVATION.

1,252,090.   Specification of Letters Patent.   Patented Jan. 1, 1918.

Application filed December 2, 1915. Serial No. 64,668.

*To all whom it may concern:*

Be it known that I, WILLIAM R. CLAYTON, a citizen of the United States, residing at Evanston, in the county of Cook and State of Illinois, have invented certain new and useful Improvements in Methods of Preservation, of which the following is a specification.

This invention relates to a method of desiccating organic bodies and has particular reference to the permanent preservation of human remains from decay which is incidental to present forms of burial.

Mold and putrefactive ferments which cause this decay can not exist in the absence of moisture and hence it follows that the removal of the moisture which forms a considerable part of organic bodies will result in the permanent preservation of the body.

It is the object of my invention to provide an inexpensive and efficient method of removing the moisture from bodies and for permanently preserving them in an anhydrous condition, whereby decay is prevented and the sanitary conditions surrounding the burial places of the dead are greatly improved.

A further object of my invention is the provision of a method of desiccating bodies in which the moisture removed is converted into a solid form in combination with the desiccating material, thus insuring permanent dryness of the receptacle containing the body.

Other objects and advantages of my invention will be apparent as it is better understood by reference to the following description when read in connection with the accompanying drawing in which—

Figure 1 is a vertical section through a structure adapted for use in carrying out my method;

Fig. 2 is a horizontal section on the line 2—2 of Fig. 1, and

Fig. 3 is a horizontal section on the line 3—3 of Fig. 1.

While the structure illustrated in the drawing is by no means essential to the method presently to be described it illustrates a form of receptacle which is well adapted to use in connection with the method. A base 1 is illustrated which forms a foundation for the structure and preferably extends to a point somewhat above the grade of the surrounding earth. Upon the base 1 the side and end walls 2 are erected, preferably of brick, although any suitable structural material which is permanent in nature may be employed. A cap 3, forming a roof, is disposed above the walls 2 and may be of concrete and provided with a waterproof covering 4. The cap 3 is supported during the course of erection by false work 5 which may remain permanently in position. The interior of the structure thus formed is coated with a layer 6 of waterproof cement and in the present instance the interior is divided into two chambers by a partition 7, also of waterproof cement. Within the separate chambers walls composed of hollow porous tiles 8 are erected adjacent the waterproof cement coating 6 and a layer of hard plaster 9 is applied to the walls of the chambers to provide a finish of pleasing appearance.

The openings in the hollow tiles 8 are filled with calcined gypsum 10, preferably freshly calcined, and false floors 11 are erected in the separate chambers, beneath which floors layers of freshly calcined gypsum 10' are disposed. The floors are constructed of wood or other suitable material to provide ducts 12 and 13, which, through suitable openings 14 and 15 in the false floors 11, communicate with the interior of the chambers. At the rear end of the structure vertical ducts 16 and 17 are formed in the end wall 2 connecting with the ducts 12 and 13, respectively, and extending downwardly into the base 1.

At the lower end of the duct 17 a heating flue 18 is provided in which a burner 19 is disposed and supplied with fuel from any suitable source, such for example as a gasolene tank 20, disposed in a pit 21. The flue 18 is open to the atmosphere so that the products of combustion may escape and air is supplied to the pit 21 and the burner 19 through an opening 22. A plate 23 prevents access of air from the pit 21 to the ducts 16 and 17. From the base of the ducts 16 and 17 a pipe 24, provided with a seal 25, leads to a drain 26 to care for any moisture or surplus gases which may accumulate in the ducts 16 and 17. Hand holes 30 are provided in the rear wall 2 opposite the ducts 12 and 13, the holes 30 being normally sealed by plugs 31.

It is known that calcined gypsum, particularly when freshly calcined, has a strong affinity for water and I have discovered that it is a splendid desiccating material for organic bodies. Furthermore, this material has the advantage that the moisture is absorbed and combines with the gypsum as water of crystallization, in which form it is permanently retained. It will be understood, therefore, that where calcined gypsum is placed in a sealed chamber with the body to be desiccated no moisture, as such, will accumulate in the chamber so long as the supply of gypsum is sufficient to absorb it. In carrying out my method I place the body, which is preferably embalmed, although this is not essential, in the usual casket 27 having a false floor 28, the casket being, moreover, provided with openings 29 in its bottom so placed as to register with the openings 14 and 15 in the false floors 11 of a chamber similar to that already described. The chamber is sealed and the desiccating action of the calcined gypsum, which has previously been disposed within the openings in the hollow porous tile forming the walls of the chamber and beneath the false floors, commences at once and continues, so long as moisture exists in the body, to withdraw and combine with the moisture.

The operation may be hastened by circulation of the atmosphere within the chamber and this may be accomplished in a variety of ways, such for example as the provision of the heating flue 18 in the vertical duct 17 which causes the gases to rise, pass through the duct 13 and upwardly into the chamber and the casket, thence through the duct 12 and downwardly through the duct 16, after which they again pass over the flue 18. The heating of the atmosphere has an additional effect in causing the atmosphere to become capable of carrying a great proportion of moisture and serves to hasten the desiccation of the body. Preferably the temperature of the atmosphere is raised to a point not above that of the blood of living bodies.

The value of the method may be further enhanced by a primary desiccation before the body is placed in the permanent receptacle. The object of the primary desiccation is to remove a portion of the most easily removed moisture and places the body in such condition that the slower action within the permanent receptacle will result in the most satisfactory preservation of the body. The primary desiccation may be carried out in any suitable manner and in apparatus intended specifically for that purpose, it being understood that the moisture nearer the surface may be removed with considerable rapidity and that the rapidity of action may be further increased by the use of materials such as a strong sulfuric acid or calcium chlorid as desiccating agents which materials are not suitable for use in the permanent receptacle heretofore described, sulfuric acid because of its strong corrosive nature and calcium chlorid because the moisture absorbed does not combine with the material as in the case of gypsum but serves to moisten the mass which finally dissolves in the moisture absorbed.

It will be understood from the foregoing that I have perfected a method of preserving organic bodies which is simple and inexpensive and which will preserve bodies from decay indefinitely. By the use of my method the unhealthful conditions surrounding the burial places of the dead are entirely eliminated.

It will be obvious that various changes may be made in the form, construction and arrangement of the parts without departing from the spirit and scope of the invention or sacrificing any of its material advantages, the form hereinbefore described being merely a preferred embodiment thereof.

I claim:

1. The method of desiccating bodies which comprises subjecting said bodies through the medium of the surrounding atmosphere to the desiccating action of calcined gypsum, and causing a circulation of the atmosphere between said bodies and calcined gypsum.

2. The method of desiccating bodies which comprises subjecting said bodies through the medium of the surrounding atmosphere to the desiccating action of calcined gypsum, and heating the atmosphere, thereby causing a circulation thereof between said body and calcined gypsum.

3. The method of desiccating bodies which comprises heating the atmosphere surrounding said bodies, and subjecting said bodies through the medium of the atmosphere to the desiccating action of calcined gypsum.

4. The method of desiccating bodies which comprises subjecting a body to a primary desiccation to remove a portion of the moisture, depositing said body in a sealed chamber, and subjecting said body through the atmosphere surrounding it within said chamber to the desiccating action of calcined gypsum.

5. The method of desiccating bodies which comprises subjecting a body to a primary desiccation to remove a portion of the moisture, depositing said body in a sealed chamber, heating the atmosphere of said chamber, and subjecting said body through the medium of the atmosphere surrounding it within said chamber to the desiccating action of calcined gypsum.

6. The method of desiccating bodies which comprises subjecting a body to a primary desiccation to remove a portion of the moisture, depositing said body in a sealed chamber, subjecting said body through the medium of the atmosphere surrounding the body in said chamber to the desiccating action of calcined gypsum, and causing a circulation of said atmosphere between said body and calcined gypsum.

7. A method of desiccating bodies which comprises depositing a body in a sealed chamber, heating the atmosphere surrounding the body in said chamber, and subjecting the body through the medium of said atmosphere to the action of the desiccating material.

8. A method of desiccating bodies which comprises subjecting a body to a primary desiccation to remove a portion of the moisture, depositing the body in a sealed chamber, heating the atmosphere surrounding the body in said chamber, and subjecting the body through the medium of said atmosphere to the action of the desiccating material.

9. A method of desiccating bodies which comprises subjecting a body to a primary desiccation to remove a portion of the moisture, depositing the body in a sealed chamber, heating the atmosphere surrounding the body in said chamber, subjecting the body through the medium of said atmosphere to the action of a desiccating material, and causing a circulation of said atmosphere between said body and desiccating material.

10. The method of desiccating bodies which comprises subjecting said bodies in a sealed chamber through the medium of the surrounding atmosphere to the action of a desiccating material and causing a circulation of the atmosphere between said bodies and desiccating material.

WILLIAM R. CLAYTON.

Witnesses:
ERNEST H. MERCHANT,
W. T. WESTERBERG.

Copies of this patent may be obtained for five cents each, by addressing the "Commissioner of Patents, Washington, D. C."